April 18, 1950 S. L. GOLDSBOROUGH 2,504,827

MINIMUM-VOLTAGE NETWORK

Filed Nov. 28, 1947

WITNESSES:
Robert C. Baird
Wm. C. Groome

INVENTOR
Shirley L. Goldsborough.
BY O. B. Buchanan
ATTORNEY

Patented Apr. 18, 1950 2,504,827

UNITED STATES PATENT OFFICE 2,504,827

MINIMUM-VOLTAGE NETWORK

Shirley L. Goldsborough, Basking Ridge, N. J., assignor to Westinghouse Electric Corporation, East Pittsburgh, Pa., a corporation of Pennsylvania Application November 28, 1947, Serial No. 788,583

4 Claims. (Cl. 175—294)

My invention relates to voltage-responsive devices which are designed to respond to the smallest of two or more voltages.

The object of my invention is to provide a minimum-voltage network from which an appreciable amount of power can be obtained without destroying the regulation or response of the network.

Heretofore, a minimum-voltage network has been known, as shown in the Harder Patent 2,393,043, granted January 15, 1946. The network which was shown in this patent was subject to two important limitations, first because the output-voltage of the network could not follow the lowest of the impressed control-voltages below a certain minimum value of the control-voltage, which was considerably above zero, and second because this network required either a very small loading-resistance $R_r$ which imposed a very considerable burden on the supply-circuit rectifier-bridge, or it required such a high regulation-circuit resistance $R_s$ that a reasonable amount of energy could not be taken off of the output-circuit of the network without ruining the regulation or response to the minimum control-voltage.

It is a more specific object of my present invention to provide a minimum-voltage network in which each of the unidirectional control-voltages is first subtracted from a constant reference-voltage, so that the difference between the reference-voltage and the minimum control-voltage is the largest one of the resultant difference-voltages, then this largest difference-voltage is selected, by means of a rectifier included in each connection, so that a maximum-voltage response is obtained, then a two-coil differential-relay is provided, in which the restraint-coil is energized in response to the maximum difference-voltage, and the operating-coil is constantly energized so as to cancel the constant-voltage part of the applied differential restraint-voltage, leaving a response to only the minimum control-voltage.

Figure 1:
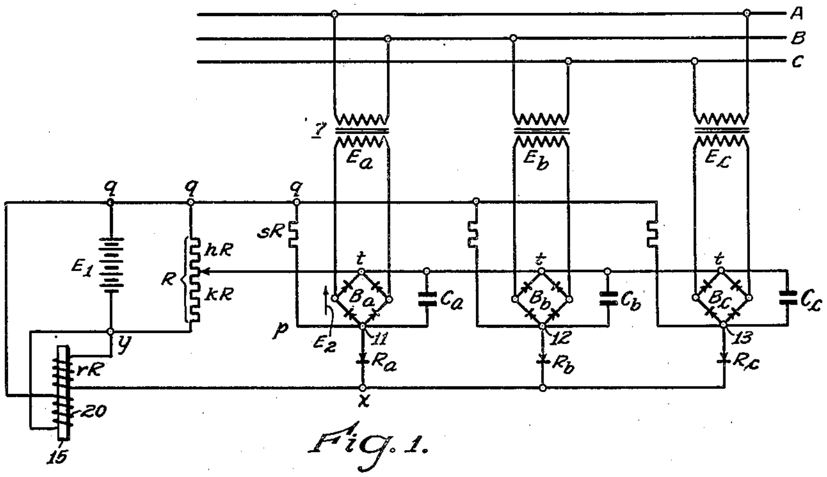
Figure 4:
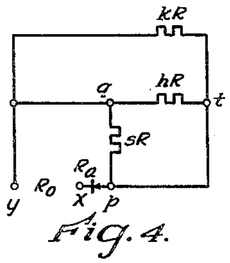
Figure 5:
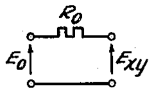
Figure 6:
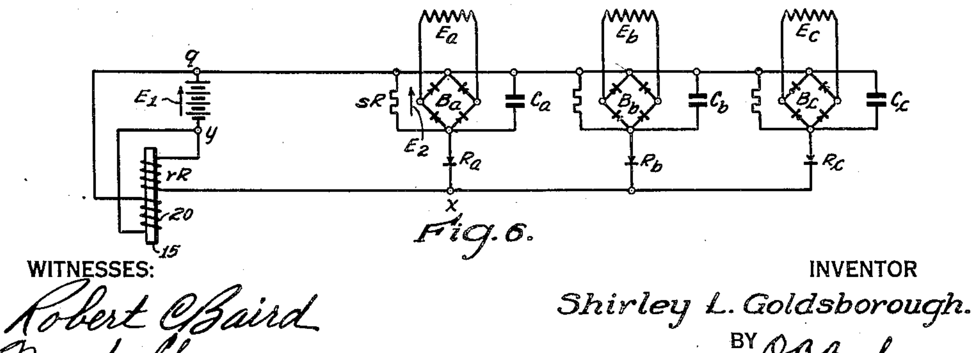

With the foregoing and other objects in view, my invention consists in the circuits, systems, combinations, apparatus and parts of apparatus, hereinafter described and claimed, and illustrated in the accompanying drawing, wherein:

Figure 1 is a diagrammatic view of circuits and apparatus embodying my invention in an illustrative form of embodiment, Figs. 2, 3, 4 and 5 are equivalent diagrams which will be referred to in the explanation, and Fig. 6 is a diagrammatic view of circuits and apparatus embodying the essential features of my invention in a simple circuit.

In Figure 1, I have shown my invention, by way of example, as being applied to the problem of selecting, and responding to, the smallest of three line-voltages $E_a$, $E_b$ and $E_c$, which are derived, by means of potential transformers 7, from a three-phase line ABC. It will be understood, of course, that my invention is not limited to any particular number of independently variable controlling-voltages, from which the lowest voltage is to be selected and responded to, and that these controlling-voltages do not have to be delta or star line-voltages.

My minimum-voltage apparatus requires unidirectional control-voltages, from which the smallest one is to be selected and responded to, and hence the three alternating-current control-voltages $E_a$, $E_b$ and $E_c$ of Fig. 1 are rectified, as by means of rectifier-bridges $B_a$, $B_b$ and $B_c$, respectively, the output-voltages of which are smoothed by ripple-suppressor filters, indicated by capacitors $C_a$, $C_b$ and $C_c$, respectively. The three rectified control-voltages are subtracted from a common network-point or conductor $t$, by having the positive output-terminals of the three bridges $B_a$, $B_b$ and $B_c$ connected to this conductor $t$. The three negative bridge-terminals 11, 12 and 13, respectively, are connected, through individual rectifiers $R_a$, $R_b$ and $R_c$, respectively, to a common network-point or conductor $x$, with the rectifiers $R_a$, $R_b$ and $R_c$ connected in such polarity as to conduct current only toward the point $x$, so that the potential of the point $x$ is raised to the potential of the bridge-terminal 11, 12 or 13 which has the highest positive voltage.

In the following discussion, it will always be assumed that the alternating-current control-voltage $E_a$ is the smallest of the three control-voltages $E_a$, $E_b$ and $E_c$, corresponding to a phase-A fault-condition on the line ABC. The rectified or unidirectional bridge-voltage of this minimum control-circuit $E_a$ is represented by the vector $E_2$. Consequently, the negative bridge-terminal 11 has a potential which is more positive than the potentials of the corresponding terminals 12 and 13 of the other control-circuits, because a smaller rectified voltage $E_2$ has been subtracted from the potential of a common point $t$. The rectifier $R_a$ therefore conducts current, in its current-conducting direction, bringing the potential of the point $x$ up to the potential of the maximum-voltage point 11, which is also indicated by the reference-letter $p$, making the point $x$ more positive than either the point 12 or the point 13, but the rectifiers $R_b$ and $R_c$ cannot conduct current in the direction from $x$ to 12 or 13, thus cutting off the points 12 and 13 from the network-point $x$, the same as if these points 12 and 13 had been disconnected from the point $x$ (neglecting the rectifier leakage-current in the non-conducting direction).

The negative bridge-terminals 11, 12 and 13 are each separately connected to a common network-point $q$, each through it own shunting resistor $s$R, but since the points 12 and 13 are effectually cut off from the network, by the rectifiers $R_b$ and $R_c$, attention may be directed exclusively to the resistor $s$R which connects the points $p$ and $q$ of the network.

The minimum-voltage network, in Fig. 1, is really a maximum-voltage network, which receives power from a unidirectional source $E_1$, which is represented by a battery, and which does not need to have a constant voltage, because its voltage, whatever it is, is finally cancelled out, in the relay-response, so that its voltage is immaterial, so long as it does not fall to too low a value, as will be subsequently pointed out. The positive terminal of the battery $E_1$ is connected to the network-point $q$, and the negative terminal is connected to a network-point $y$. Between the network-points $q$ and $y$ is connected a potentiometer having a resistance R, which is divided into two portions $h$R and $k$R by a slider which constitutes the network-point $t$. The voltage between the points $t$ and $y$ thus serves as a reference-voltage from which the minimum control-voltage $E_2$ is subtracted.

In accordance with my present invention, a relay 15 is provided, which is to be controlled or energized in response to the minimum control-voltage $E_a$ or $E_2$. Throughout the specification, I use the term "relay" as being broad enough to include either a relay or a regulator or any other voltage-responsive device, or the voltage-responsive part of any electroresponsive device, regardless of whether the device is impressed with any other controls other than the voltage-responsive control.

In the particular form of my invention which is shown in Fig. 1, I use a relay 15, or a relay-core 15, having two differential energizing or flux-producing coils thereon, two coils being used because the particular network which is shown could not supply a minimum-voltage response to a single relay-coil without the addition of loading-resistors which would increase the burden on the network, as will be subsequently pointed out, but I do not consider myself limited altogether to a two-coil relay. As shown, the relay 15 is a differential relay, having an operating-coil 20 and a restraint-coil $r$R. The operating-coil 20 is energized from the terminals $q$ and $y$ of the source $E_1$, and the restraint-coil $r$R is energized from the previously mentioned network-terminals $x$ and $y$.

Figure 2:
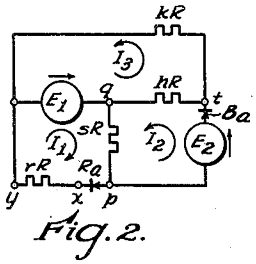

The operation of my invention will be explained with reference to the equivalent diagrams and transformations shown in Figs. 2, 3, 4 and 5. Fig. 2 shows the equivalent of the network which energizes the restraint-winding $r$R. The alternating-current control-voltage $E_a$ and its rectifier-bridge $B_a$, as shown in Fig. 1, are represented, in Fig. 2, by a source $E_2$ and a rectifier $B_a$. The other two control-circuit sources and rectifiers of Fig. 1 do not appear in Fig. 2, because they are cut off from the point $x$ by their rectifiers $R_b$ and $R_c$, respectively, as already explained.

Figure 3:
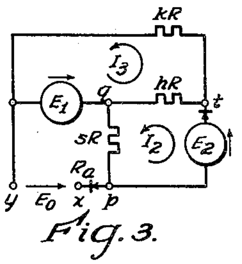

Using Thevenin's theorem, let us replace the equivalent network of Fig. 2, with the equivalent network of Fig. 5, using the transformations of Figs. 3 and 4.

Fig. 2 is the equivalent of Fig. 1 when the $E_a$ is the minimum alternating-current voltage, and when the current-flow is in the direction of the arrows $I_1$ and $I_2$ in Fig. 2, in an ideal case in which the rectifier-resistances are assumed to be negligibly small in the conducting direction, and infinitely large in the blocking direction.

Considering the terminals $x$ and $y$ as the output-terminals of the Fig. 2 network, the network acts as if it were replaced by a single internal E. M. F. $E_0$, in series with a single internal resistance $R_0$, as shown in Fig. 5. The equivalent E. M. F. $E_0$ is the open-circuit E. M. F. of the Fig. 2 network, without the relay restraint-coil resistance $r$R, as shown in Fig. 3. The equivalent resistance $R_0$, according to Thevenin's theorem, is the resistance of the Fig. 3 network with the sources $E_1$ and $E_2$ short-circuited, as shown in Fig. 4.

In Fig. 3, the sums of the voltages are zero in each of the two meshes, yielding $$E_2-hR(I_2-I_3)-sRI_2=0 \quad (1)$$
$$E_1+hR(I_2-I_3)-kRI_3=0 \quad (2)$$

Solving these two equations for the current $I_2$, and remembering that $(h+k)=1$, $$I_2=\frac{hE_1+E_2}{(hk+s)R} \quad (3)$$

In Fig. 3, the network E. M. F. $E_0$ is found by inspection to be $$E_0=E_1-sRI_2 \quad (4)$$

Substituting (3) in (4), and again remembering that $(1-h)=k$, $$E_0=\frac{(h+s)kE_1-sE_2}{hk+s}=\left(1-\frac{hs}{hk+s}\right)E_1-\frac{sE_2}{hk+s} \quad (5)$$

In Fig. 4, the network-resistance $R_0$ is the equivalent of three parallel-connected resistors $s$R, $h$R and $k$R. Remembering that $(h+k)=1$, we find the network-resistance to be $$R_0=\frac{hksR}{hk+s} \quad (6)$$

We have thus found that the network of Fig. 2 applies a voltage $$\frac{(h+s)kE_1-sE_2}{hk+s}$$

to the relay restraint-coil $r$R in series with an internal network-resistance $$\frac{hksR}{hk+s}$$

The relay-restraint is thus proportional to a variable voltage which is equal to a constant term $$\frac{(h+s)kE_1}{hk+s}$$

minus a minimum-voltage-responsive variable term $$\frac{sE_2}{hk+s}$$

The operating relay-coil 20 supplies a relay-actuating magneto-force of enough ampere-turns to be the equivalent of a constant operating-voltage, $$E_R=-\frac{(h+s)kE_1}{hk+s}=-E_1\left(1-\frac{hs}{hk+s}\right) \qquad (7)$$

applied, in series with a resistance $$\frac{hksR}{hk+s}$$

to a coil having the same number of turns and the same resistance as the restraint-coil $rR$. This operating-voltage is thus equal and opposite, in its effect, to the constant part of the restraint-coil response. The minus or negative part of the restraint-coil voltage thus becomes the only effective voltage on the relay, operating in a relay-actuating direction. It makes the relay operate as if its restraint-coil $rR$ were the only relay-coil, and as if this coil were impressed by the voltage $$\frac{sE_2}{hk+s}$$

in series with a resistance $$\frac{hksR}{hk+s}$$

in addition to its own coil-resistance $rR$.

In the particular form of network which is illustrated in Figs. 1 and 2, the rectifier $R_a$ cannot carry a relay-current in the negative direction, or direction opposite to the mesh-current $I_1$ in Fig. 2. For this reason, a separate relay-coil 20 is required for the constant negative restraint-excitation.

Also, in the particular form of network which is illustrated in Figs. 1 and 2, the control-circuit rectifier-bridge $B_a$ cannot carry current in the negative direction, or direction opposite to the mesh-current $I_2$ in Fig. 2. For this reason, the relative values of $h$, $k$, $s$ and $r$, (or the position of the slider $t$ on the potentiometer R in Fig. 1), must be such that the voltage of the point $t$ is never negative with respect to the point $p$, not even when the control voltage $E_2$ is zero. It is convenient to choose the constants so that $$\frac{sE_2}{hk+s}$$

varies between zero and $$\left(1-\frac{hs}{hk+s}\right)E_1$$

while the control-voltage $E_2$ varies between zero and the maximum control-voltage value which is to have any effect on the network, that is, the value at which the equivalent network-voltage $E_0$ becomes zero. This voltage $E_0$ cannot become negative, in the particular form of network shown in Figs. 1 and 2, because of the presence of the rectifier $R_a$.

Fig. 6 shows a much simpler form of embodiment of my invention, without the voltage-adjustment features of Fig. 1. In Fig. 6, the coefficient $k$ of Fig. 1 has been made infinite, and the coefficient $h$ of Fig. 1 has been made zero. The three rectified bridge-voltages are simply subtracted from the voltage of the positive terminal $q$ of the battery $E_1$. No potentiometer R is used. The rectifiers $R_a$, $R_b$ and $R_c$ select the largest of the difference-voltages ($E_1$—$E_2$) and apply it directly to the relay restraint-coil $rR$, and the relay operating-coil 20 furnishes the same number of ampere-turns as appear in the restraint-coil $rR$ when the minimum control-voltage $E_2$ is zero.

In both Figs. 1 and 6, it will be noted that the shunting-resistors $sR$ provide bypassing paths around the respective rectifier-bridges $B_a$, $B_b$ and $B_c$, so that the downwardly flowing current in the individual rectifier $R_a$ which is associated with the minimum control-voltage $E_a$ can flow downwardly through the corresponding shunting-resistor $sR$, without having to flow downwardly, in the non-conducting direction, through the corresponding minimum-voltage rectifier-bridge $B_a$. In this way, I avoid placing the relatively large back-current resistance of the rectifier-bridge $B_a$ in series with the restraint-coil $rR$.

While I have illustrated my invention in but two preferred forms of embodiment, and while I have discussed its principal requirements and limitations to some extent, I wish it to be understood that my invention is not limited to the particular forms and diagrams shown, as various modifications may be made, by way of additions, omissions and substitutions, without departing from the essential spirit of my invention. I desire, therefore, that the appended claims shall be accorded the broadest construction consistent with their language.

I claim as my invention:

1. A minimum-voltage-responsive device for responding to the smallest one of a plurality of unidirectional control-voltages, comprising the combination, with a plurality of unidirectional control-voltage source-means which are impressed with the respective unidirectional control-voltages, of an auxiliary unidirectional reference-voltage source-means which is impressed with a unidirectional reference-voltage, a plurality of circuit-means, including individual-circuit rectifiers, for separately connecting the several control-voltage source-means between a first terminal of said reference-voltage source-means and a common output-terminal of the device, said first terminal of said reference-voltage source-means being connected to the like-polarity terminals of the several control-voltage source-means, the individual-circuit rectifiers being connected in such polarity that a substantial current-flow can occur only in the individual-circuit rectifier which is connected to the control-voltage source-means having the minimum control-voltage, and means connected to said common output-terminal of the device, and to two terminals of said control-voltage source-means, in such manner as to obtain a response to the difference between the source-voltage and the selected maximum difference-voltage of the network-terminals, whereby a response is obtained substantially solely to the smallest of the control-voltages.

2. A minimum-voltage-responsive device for responding to the smallest one of a plurality of unidirectional control-voltages, comprising the combination, with a plurality of unidirectional control-voltage source-means which are impressed with the respective unidirectional control-voltages, of an auxiliary unidirectional reference-voltage source-means which is impressed with a unidirectional reference-voltage, a first common circuit-means connected to a first terminal of said reference-voltage source-means, a second common circuit-means connected to an opposite-polarity terminal of said reference-voltage source-means, having a polarity opposite to that of said first terminal of said reference-voltage source-means, a plurality of circuit-means, including individual-circuit rectifiers, for separately connecting the several control-voltage source-means between said first and second common circuit-means, said first and second common circuit-means being each connected to the like-polarity terminals of the several control-voltage source-means, the individual-circuit rectifiers being connected in such polarity that a substantial current-flow can occur only in the individual-circuit rectifier which is connected to the control-voltage source-means having the minimum control-voltage, a differential electro-responsive element having an operating-coil and a restraint-coil, means for energizing the operating-coil from said reference-voltage source-means, so that said operating-coil is responsive to said reference-voltage, and means for energizing the restraint-coil in series with one of said first and second common circuit-means, so that said restraint-coil is responsive to the difference-voltage between a voltage of said reference-voltage source-means and said minimum control-voltage, the strengths of excitations of the two coils being such that together they provide a net response substantially solely to the smallest of the control-voltages.

3. A minimum-voltage-responsive device for responding to the smallest one of a plurality of unidirectional control-voltages, comprising the combination, with a plurality of unidirectional control-voltage source-means which are impressed with the respective unidirectional control-voltages, of an auxiliary unidirectional reference-voltage source-means which is impressed with a unidirectional reference-voltage, a potentiometer connected across said reference-voltage source-means, said potentiometer having an adjustable tap-means for providing an intermediate reference-voltage terminal of a first polarity, circuit-means for connecting said intermediate reference-voltage terminal to the like-polarity terminals of each of said control-voltage source-means, a plurality of circuit-means, including individual-circuit rectifiers, for separately connecting the opposite-polarity terminals of the several control-voltage source-means to a common output-terminal of the device, the individual-circuit rectifiers being connected in such polarity that a substantial current-flow can occur only in the individual-circuit rectifier which is connected to the control-voltage source-means having the minimum control-voltage, a plurality of other circuit-means, including individual-circuit impedances, for separately connecting the aforesaid opposite-polarity terminals of the several control-voltage source-means to the first-polarity terminal of the reference-voltage source-means, having the same polarity as the polarity of said adjustable tap-means of the potentiometer, and means connected to said common output-terminal of the device, and to two terminals of said control-voltage source-means, in such manner as to obtain a response to the difference between the source-voltage and the selected maximum difference-voltage of the network-terminals, whereby a response is obtained substantially solely to the smallest of the control-voltages.

4. A minimum-voltage-responsive device for responding to the smallest one of a plurality of unidirectional control-voltages, comprising the combination, with a plurality of unidirectional control-voltage source-means which are impressed with the respective unidirectional control-voltages, of an auxiliary unidirectional reference-voltage source-means which is impressed with a unidirectional reference-voltage, a potentiometer connected across said reference-voltage source-means, said potentiometer having an adjustable tap-means for providing an intermediate reference-voltage terminal of a first polarity, circuit-means for connecting said intermediate reference-voltage terminal to the like-polarity terminals of each of said control-voltage source-means, a plurality of circuit-means, including individual-circuit rectifiers, for separately connecting the opposite-polarity terminals of the several control-voltage source-means to a common output-terminal of the device, the individual-circuit rectifiers being connected in such polarity that a substantial current-flow can occur only in the individual-circuit rectifier which is connected to the control-voltage source-means having the minimum control-voltage, a plurality of other circuit-means, including individual-circuit impedances, for separately connecting the aforesaid opposite-polarity terminals of the several control-voltage source-means to the first-polarity terminal of the reference-voltage source-means, having the same polarity as the polarity of said adjustable tap-means of the potentiometer, a differential electro-responsive element having an operating-coil and a restraint-coil, means for energizing the operating-coil from said reference-voltage source-means, so that said operating-coil is responsive to said reference-voltage, and means for energizing the restraint-coil from said common output-terminal of the device and from an opposite-polarity terminal of said reference-voltage source-means, having a polarity opposite to that of said adjustable tap-means of the potentiometer, so that said restraint-coil is responsive to the difference-voltage across said two terminals, the strengths of excitations of the two coils being such that together they provide a net response substantially solely to the smallest of the control-voltages.

SHIRLEY L. GOLDSBOROUGH.

No references cited